US011525641B2

(12) United States Patent
Miljkovic et al.

(10) Patent No.: US 11,525,641 B2
(45) Date of Patent: Dec. 13, 2022

(54) HEAT AND MASS TRANSFER COMPONENT COMPRISING A LUBRICANT-IMPREGNATED SURFACE

(71) Applicant: The Board of Trustees of the University of Illinois, Urbana, IL (US)

(72) Inventors: Nenad Miljkovic, Urbana, IL (US); Soumyadip Sett, Urbana, IL (US); George Barac, Saint Charles, IL (US); Leslie W. Bolton, Fleet (GB)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 239 days.

(21) Appl. No.: 16/854,014

(22) Filed: Apr. 21, 2020

(65) Prior Publication Data

US 2020/0333087 A1    Oct. 22, 2020

Related U.S. Application Data

(60) Provisional application No. 62/836,848, filed on Apr. 22, 2019.

(51) Int. Cl.
*C10M 107/38* (2006.01)
*F28F 19/02* (2006.01)
(Continued)

(52) U.S. Cl.
CPC .......... *F28F 19/02* (2013.01); *B01D 5/0003* (2013.01); *B01D 5/009* (2013.01); *B01D 5/0039* (2013.01);
(Continued)

(58) Field of Classification Search
CPC .......... F28F 13/04; F28F 13/185; F28F 19/02; C10N 2050/025; C10M 107/38
See application file for complete search history.

(56) References Cited

U.S. PATENT DOCUMENTS

2013/0032316 A1    2/2013  Dhiman et al.
2013/0220813 A1    8/2013  Anand et al.
(Continued)

FOREIGN PATENT DOCUMENTS

CN         103917306 A       7/2014
WO    WO-2012100099 A2 *    7/2012    ............. A61L 15/24
(Continued)

OTHER PUBLICATIONS

KRYTOX general purpose grades—product information—2017.*
(Continued)

*Primary Examiner* — Devon Russell
(74) *Attorney, Agent, or Firm* — Crowell & Moring LLP (57) ABSTRACT

A heat and mass transfer component comprises a lubricant-impregnated surface including hydrophobic surface features, which comprise nanostructured surface protrusions having a hydrophobic species attached thereto. The hydrophobic surface features are impregnated with a fluorinated lubricant having a viscosity in a range from about 400 mPa·s to about 6000 mPa·s. A method of fabricating a lubricant-impregnated surface on a heat and mass transfer component comprises: cleaning a thermally conductive substrate to form a cleaned substrate; exposing the cleaned substrate to a hot water or hot alkaline solution to form a thermally conductive substrate having nanostructured surface protrusions; depositing a hydrophobic species on the nanostructured surface protrusions to form hydrophobic surface features; and coating the hydrophobic surface features with a fluorinated lubricant having a viscosity in a range from 400 mPa·s to 6000 mPa·s. The heat and mass transfer component may exhibit a substantial increase in heat transfer coefficient during hydrocarbon condensation.

20 Claims, 6 Drawing Sheets

(51) Int. Cl.
    C10G 7/10      (2006.01)
    B01D 5/00      (2006.01)
    F28D 21/00     (2006.01)
    F28F 13/04     (2006.01)
    F28F 13/18     (2006.01)
    F28F 19/04     (2006.01)
    F28F 21/06     (2006.01)
    C10N 50/00     (2006.01)
(52) U.S. Cl.
    CPC ............ C10G 7/10 (2013.01); C10M 107/38
        (2013.01); C10N 2050/025 (2020.05); F28D
        21/0015 (2013.01); F28F 13/04 (2013.01);
        F28F 13/185 (2013.01); F28F 19/04
        (2013.01); F28F 21/067 (2013.01)

(56) References Cited

U.S. PATENT DOCUMENTS

| | | | | |
|---|---|---|---|---|
| 2014/0238646 | A1* | 8/2014 | Enright | F28D 15/02 29/890.03 |
| 2015/0048526 | A1 | 2/2015 | Kim et al. | |
| 2016/0097606 | A1* | 4/2016 | Xiao | B05D 5/02 427/256 |
| 2017/0333941 | A1* | 11/2017 | Park | B05D 5/08 |
| 2018/0147604 | A1 | 5/2018 | Dai et al. | |

FOREIGN PATENT DOCUMENTS

| | | | | |
|---|---|---|---|---|
| WO | WO-2014179733 | A1 * | 11/2014 | ........... B01D 5/0003 |
| WO | WO-2017163127 | A1 * | 9/2017 | ............ F28F 13/187 |

OTHER PUBLICATIONS

Anand et al., "Enhanced Condensation on Lubricant-Impregnated Nanotextured Surfaces," *ACS Nano*, vol. 6 (2012) pp. 10122-10129.
Anand et al., "How droplets nucleate and grow on liquids and liquid impregnated surfaces," *Soft Matter*, vol. 11 (2015) pp. 69-80.
Attinger et al., "Surface Engineering for Phase Change Heat Transfer: a Review," *MRS Energy & Sustainability* (2014) pp. 1-85.
Beér, "High efficiency electric power generation: the environmental role," *Progress in Energy and Combustion Science*, vol. 33 (2007) pp. 107-134.
Cavallini et al., "Condensation inside and outside smooth and enhanced tubes—a review of recent research," *International Journal of Refrigeration*, vol. 26 (2003) pp. 373-392.
Cho et al., "Nanoengineered materials for liquid-vapour phase-change heat transfer" *Nature Reviews Materials*, vol. 2 (2017) pp. 16092/1-16092/17.
Di Nicola et al., "Equations for the surface tension of low GWP halogenated alkene refrigerants and their blends," *International Journal of Refrigeration*, vol. 86 (2018) pp. 410-421.
Enright et al., "Condensation on superhydrophobic copper oxide nanostructures," *Journal of Heat Transfer*, vol. 135 (2013) pp. 1-35.
Enright et al., "Condensation on Superhydrophobic Surfaces: The Role of Local Energy Barriers and Structure Length Scale," *Langmuir*, vol. 28 (2012) pp. 14424-14432.
Enright et al., "Dropwise Condensation on Micro- and Nanostructured Surfaces," *Nanoscale and Microscale Thermophysical Engineering*, vol. 18 (2014) pp. 223-250.
Epstein et al., "Liquid-infused structured surfaces with exceptional anti-biofouling performance," *Proceedings of the National Academy of Sciences*, vol. 109 (2012) pp. 13182-13187.
Fouad et al. "Next Generation of Low Global Warming Potential Refrigerants: Thermodynamic Properties Molecular Modeling," *AIChE Journal*, vol. 64 (2018) pp. 250-262.
Hung et al., "A Review of Organic Rankine Cycles (ORCs) for the Recovery of Low-Grade Waste Heat," *Energy*, vol. 22 (1997) pp. 661-667.

Kuźnicka, "Erosion-corrosion of heat exchanger tubes," *Engineering Failure Analysis*, vol. 16 (2009) pp. 2382-2387.
Kwak et al., "Viscosity and thermal conductivity of copper oxide nanofluid dispersed in ethylene glycol," *Korea-Australia Rheology Journal*, vol. 17, No. 2 (2005) pp. 35-40.
Lafuma et al., "Slippery pre-suffused surfaces," *EPL (Europhysics Letters)*, vol. 96 (2011) pp. 56001/1-56001/5.
Lammens et al., "Availability of protein-derived amino acids as feedstock for the production of bio-based chemicals," *Biomass and Bioenergy*, vol. 44 (2012) pp. 168-181.
Lim et al., "Current Status and Perspectives of Liquefied Natural Gas (LNG). Plant Design," *Industrial & Engineering Chemistry Research*, vol. 52 (2013) pp. 3065-3088.
Liu et al., "Turning a surface superrepellent even to completely wetting Tiquids," *Science*, vol. 346, No. 346 (2014) pp. 1096-1100.
Ma et al., "Condensation heat transfer enhancement in the presence of non-condensable gas using the interfacial effect of dropwise condensation," *International Journal of Heat and Mass Transfer*, vol. 51 (2008) pp. 1728-1737.
Miao et al., "Biodiesel production from heterotrophic microalgal oil," *Bioresource Technology*, vol. 97 (2006) pp. 841-846.
Miljkovic et al., "Jumping-Droplet-Enhanced Condensation on Scalable Superhydrophobic Nanostructured Surfaces," *Nano letters*, vol. 13 (2012) pp. 179-187.
Miljkovic et al., "Condensation on hydrophilic, hydrophobic, nanostructured superhydrophobic and oil-infused surfaces," *Journal of Heat Transfer*, vol. 135, No. 8 (2013) p. 080906.
Nam et al., "A comparative study of the morphology and wetting characteristics of micro/nanostructured Cu surfaces for phase change heat transfer applications," *Journal of Adhesion Science and Technology*, vol. 27, No. 20 (2013) pp. 2163-2176.
Park et al., "Performance of alternative refrigerants for residential air-conditioning applications," *Applied Energy*, vol. 84, (2007) pp. 985-991.
Preston et al., "Design of Lubricant Infused Surfaces," *ACS Applied Materials & Interfaces*, vol. 9 (2017) pp. 42383-42392.
Preston et al., "Heat Transfer Enhancement During Water and Hydrocarbon Condensation on Lubricant Infused Surfaces," *Scientific Reports*, vol. 8, No. 540 (2018) pp. 1-9.
Rose, "Dropwise condensation theory and experiment: a review," *Proceedings of the Institution of Mechanical Engineers, Part A: Journal of Power and Energy*, vol. 216 (2002) pp. 115-128.
Rosillo-Calle et al., "Global market for bioethanol: historical trends and future prospects," *Energy for Sustainable Development*, vol. 10, No. 1 (2006) pp. 20-32.
Rufford et al., "The removal of $CO_2$ and $N_2$ from natural gas: A review of conventional and emerging process technologies," *Journal of Petroleum Science and Engineering*, vol. 94 (2012) pp. 123-154.
Rykaczewski et al., "Dropwise Condensation of Low Surface Tension Fluids on Omniphobic Surfaces," *Scientific Reports*, vol. 4, No. 4158 (2014) pp. 1-8.
Sett et al., "Lubricant-Infused Surfaces for Low-Surface-Tension Fluids: Promise versus Reality," *ACS Applied Materials & Interfaces*, vol. 9 (2017) pp. 36400-36408.
Smith et al., "Droplet mobility on lubricant-inpregnated surfaces," *Soft Matter*, vol. 9, No. 6 (2013) pp. 1772-1780.
Sun et al., "Vacuum cooling technology for the agri-food industry: Past, present and future," *Journal of Food Engineering*, vol. 77 (2006) pp. 203-214.
Tuteja et al., "Designing Superoleophobic Surfaces," *Science*, vol. 318 (2007) pp. 1618-1622.
Wang et al., "Fabrication of Slippery Lubricant-Infused Porous Surface with High Underwater Transparency for the Control of Marine Biofouling," *ACS Applied Materials & Interfaces*, vol. 9 (2016) pp. 972-982.
Wang et al., "Slippery liquid-infused porous surface bio-inspired by pitcher plant for marine anti-biofouling application," *Colloids and Surfaces B: Biointerfaces*, vol. 136 (2015) pp. 240-247.
Weisensee et al., "Condensate droplet size distribution on lubricant-infused surfaces," *International Journal of Heat and Mass Transfer*, vol. 109 (2017) pp. 187-199.

(56) References Cited

OTHER PUBLICATIONS

Weisensee et al., "Hydrophobic and oleophobic re-entrant steel microstructures fabricated using micro electrical discharge machining," *Journal of Micromechanics and Microengineering,* vol. 24 (2014) pp. 095020/1-095020/10.
Wexler et al., "Shear-driven failure of liquid-infused surfaces," *Physical Review Letters,* vol. 114 (2015) pp. 168301/1-168301/6.
Wilke et al., "Toward Condensation-Resistant Omniphobic Surfaces," *ACS Nano,* vol. 12 (2018) pp. 11013-11021.
Xiao et al., "Immersion Condensation on Oil-Infused Heterogeneous Surfaces for Enhanced Heat Transfer," *Scientific Reports,* vol. 3 (2013) pp. 1988/1-1988/6.
International Search Report and Written Opinion from corresponding International Application No. PCT/US2020/029077, dated Jul. 10, 2020, 10 pp.
Chinese Office Action and translation from corresponding Chinese Application No. 202080030562.4, dated Aug. 29, 2022, 19 pp.

\* cited by examiner

HEAT AND MASS TRANSFER COMPONENT COMPRISING A LUBRICANT-IMPREGNATED SURFACE

RELATED APPLICATION

The present patent document claims the benefit of priority under 35 U.S.C. § 119(e) to U.S. Provisional Patent Application No. 62/836,848, which was filed on Apr. 22, 2019, and is hereby incorporated by reference in its entirety.

TECHNICAL FIELD

The present disclosure relates generally to heat and mass transfer technology and more specifically to surface structures for enhancing heat transfer and reducing fouling.

BACKGROUND

Vapor condensation, which is a widely used industrial process for transferring heat and separating fluids, is vital to the success of a plethora of industrial processes including power generation, distillation, air conditioning and refrigeration systems, and natural gas processing.

Over the past century, low surface energy (<10 mJ/m$^2$) hydrophobic surfaces have been developed to promote dropwise condensation of water vapor to enhance heat transfer. However, low-surface-tension fluids such as alcohols and hydrocarbons pose a unique challenge to hydrophobic surfaces due to their comparable surface energies (10 mJ/m$^2$<γ<25 mJ/m$^2$). On hydrophobic substrates, hydrocarbon liquids show low advancing contact angle and high contact angle hysteresis, resulting in filmwise condensation. The challenge of creating non-wetting dropwise-condensing surfaces for low-surface-tension fluids has led to a focus on steam condensation heat transfer, with little progress on other fluids.

Given the recent paradigm shift towards alternative energy sources and biofuels, the need for efficient condensation and separation of low-surface-tension fluids has grown substantially. For example, world production of fuel ethanol from corn has increased from 6.5 billion gallons in 2000 to 26.7 billion gallons in 2017, and a wide range of aliphatic and aromatic hydrocarbons continue to be produced as pure species in the petrochemicals industries and as mixtures in oil refining. Furthermore, low global warming potential (low-GWP) refrigerants, many of which are aliphatic hydrocarbons, are mandated to replace existing non-flammable options, with several industrial applications including organic Rankine cycle (ORC) power generation and building energy technologies relying on effective low-surface-tension refrigerant condensation for efficient performance.

Despite progress in developing low surface energy hydrophobic and superhydrophobic coatings to enhance water vapor condensation, stable dropwise condensation of low-surface-tension fluids has not been achieved.

SUMMARY

A heat and mass transfer component comprises a lubricant-impregnated surface including hydrophobic surface features, which comprise nanostructured surface protrusions having a hydrophobic species attached thereto. The hydrophobic surface features are impregnated with a fluorinated lubricant having a viscosity in a range from about 400 mPa·s to about 6000 mPa·s.

A method of fabricating a lubricant-impregnated surface on a heat and mass transfer component comprises: cleaning a thermally conductive substrate to form a cleaned substrate; exposing the cleaned substrate to hot water or a hot alkaline solution to form a thermally conductive substrate having nanostructured surface protrusions; depositing a hydrophobic species on the nanostructured surface protrusions to form hydrophobic surface features; and coating the hydrophobic surface features with a fluorinated lubricant having a viscosity in a range from 400 mPa·s to 6000 mPa·s, thereby forming a lubricant-impregnated surface on a heat and mass transfer component.

BRIEF DESCRIPTION OF THE DRAWINGS

FIGS. 4A-4C show condensation of water, ethanol, and hexane respectively on smooth hydrophobic copper tubes, and FIGS. 4D-4F show condensation of water, ethanol, and hexane respectively on copper tubes processed to have lubricant-impregnated surfaces (LIS K1525). Chamber vapor pressure is $P_v$=4.5 kPa (4A, 4D), $P_v$=7 kPa (4B, 4E), and $P_v$=12 kPa (4C, 4F).

DETAILED DESCRIPTION

Figure 1A:
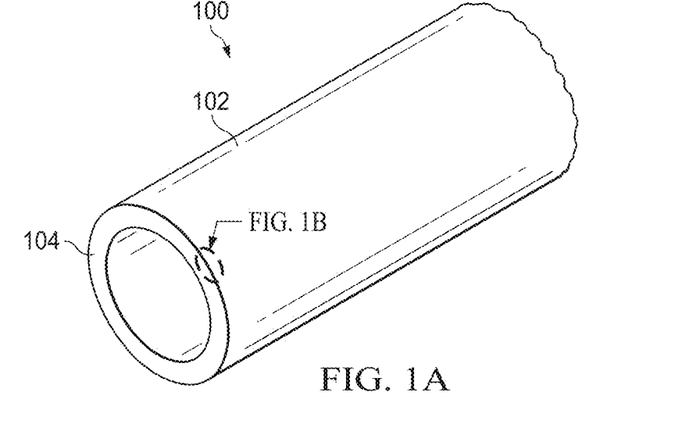
FIG. 1A is a perspective view schematic of part of an exemplary heat and mass transfer component.

FIG. 1A is a schematic of part of an exemplary heat and mass transfer component 100 that includes a durable lubricant-impregnated surface 102 to improve the heat transfer properties and/or fouling resistance of the component 100. In this schematic, the heat and mass transfer component 100 has a tubular shape, but the component 100 is not limited to this geometry and may alternatively have any size or shape suitable for the intended application. The heat and mass transfer component 100 may be used for power generation, distillation, air conditioning or refrigeration, natural gas processing, and/or production of purified or mixed aliphatic and/or aromatic hydrocarbons. The component 100 may form part or all of a heat exchanger or a fractionating column, for example.

Figure 1B:
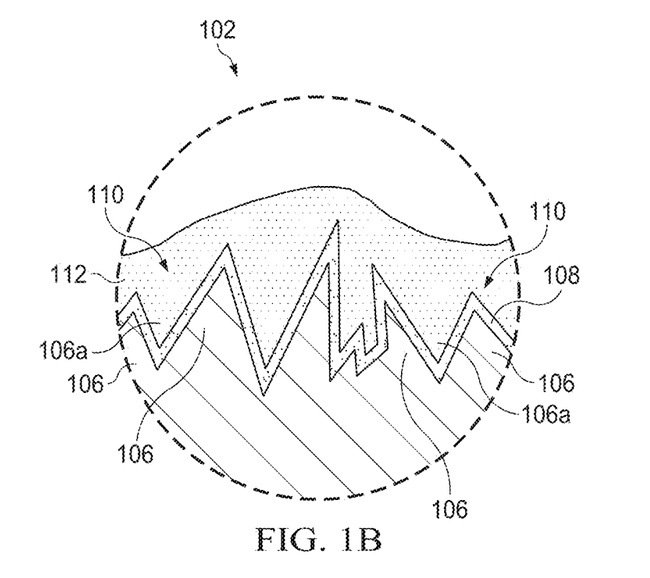
FIG. 1B is a cross-sectional schematic of a lubricant-impregnated surface on the heat and mass transfer component.

Referring to FIG. 1B, the lubricant-impregnated surface 102 includes hydrophobic surface features 110 impregnated by a fluorinated lubricant 112 which preferably has a viscosity in a range from 400 mPa·s to 6000 mPa·s, as discussed below. The hydrophobic surface features 110 comprise nanostructured surface protrusions 106 that have a hydrophobic species 108 attached thereto. Regions between adjacent surface protrusions 106 define surface crevices 106a that allow for impregnation of the fluorinated lubricant 112 by capillary forces. The heat and mass transfer component 100 further comprises a thermally conductive substrate 104 that supports the lubricant-impregnated surface 102.

Advantageously, when a working fluid contacts the lubricant-impregnated surface 102, dropwise condensation of the working fluid occurs, thereby facilitating heat transfer from the component 100. This result may be obtained even with low-surface-tension working fluids (e.g., working fluids such as ethanol having surface energy in a range from about 15-30 mN/m), which are typically susceptible to filmwise condensation. In addition, dropwise condensation may occur stably over a period of ten hours or more, and possibly up to hundreds or thousands of hours, due to the stability of the lubricant 112 within the hydrophobic surface features 110 during exposure to the working fluid. Experiments show that dropwise condensation may be achieved for time durations in excess of 1000 hours, and even beyond 2880 hours (>120 days).

Similarly, when a working fluid that includes dissolved, suspended, entrained, crystallized and/or precipitated solids contacts the lubricant-impregnated surface 102, deposition of solids on the lubricant-impregnated surface may be inhibited. In addition, crystallization and/or precipitation of the solids may be inhibited. Thus, the component 100 can resist fouling. Again, due to the stability of the lubricant 112 within the hydrophobic surface features 110, this antifouling property may be maintained for a period of ten hours or more, and possibly up to hundreds or thousands of hours (e.g., greater than 1000 hours, or greater than 2880 hours), during exposure to the working fluid.

The thermally conductive substrate 104 may comprise a metal selected from the group consisting of Cu, Al, Fe and Ti. For example, the thermally conductive substrate 104 may comprise copper or a copper alloy, such as brass, aluminum or an aluminum alloy, iron or an iron alloy, such as stainless steel, and/or titanium or a titanium alloy. The nanostructured surface protrusions 106 may comprise an oxidized metal selected from the group consisting of copper oxide, aluminum oxide, iron oxide, and titanium dioxide. As described below, the nanostructured surface protrusions 106 may be formed in a process that entails surface oxidation of the thermally conductive substrate 104 and leads to nanostructuring of the surface. Typically, the nanostructuring/surface oxidation extends to a depth of about 2 microns or less, or about 1 micron or less into the thermally conductive substrate 104.

Figure 2A:
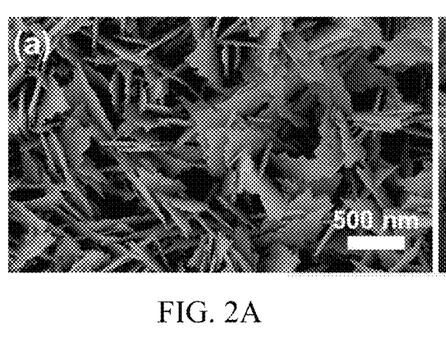
FIGS. 2A and 2B are scanning electron microscope (SEM) and focused ion beam (FIB) images of nanostructured surface protrusions comprising copper oxide.
Figure 2B:
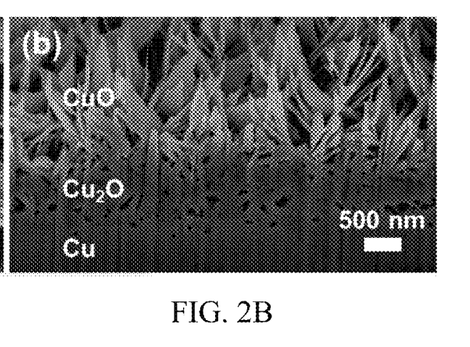

The nanostructured surface protrusions 106 may exhibit a roughness factor r in a range from about 5 to about 50. The roughness factor r may be defined as a ratio of the total surface area to the projected area (e.g., to the area of a smooth surface of the same size and geometric shape). The nanostructured surface protrusions may be uniform in size, shape and position, or the surface protrusions may be nonuniform (irregular) in size, shape and/or position, as illustrated in FIG. 1B. Depending on the fabrication method, the surface protrusions may be described as having a knife-like or blade-like shape, as can be seen in the SEM and FIB images of FIGS. 2A and 2B, where the length of each protrusion is greater than its width, and the width is much greater than the thickness. In other examples, the surface protrusions may be conical, cylindrical, and/or bar-shaped. Typically, the nanostructured surface protrusions may have a height in a range from about 300 nm to about 3 microns, or more typically from about 500 nm to about 1 micron. The width or diameter of the surface protrusions may lie in a range from about 50 nm to about 1 micron, or more typically from about 100 nm to about 500 nm. In the case of knife-like protrusions, the thickness may lie in a range from about 10 nm to about 200 nm, or from about 10 nm to about 100 nm.

The nanostructured surface protrusions are rendered hydrophobic by surface modification (or functionalization) with a hydrophobic species. A chemical vapor deposition (CVD) process as described below or another suitable method may be employed for surface functionalization. During CVD, the desired hydrophobic species is deposited on the surface protrusions. Accordingly, what may be described as a conformal coating or monolayer comprising the hydrophobic species may be formed on/attached to the surface protrusions. The hydrophobic species may be understood to be a hydrophobic molecule or compound. Typically, the hydrophobic species comprises a silane, such as a methyl-silane, a linear alkyl-silane, a branched alkyl-silane, an aromatic silane, a fluorinated alkyl-silane, and/or a dialkyl-silane. A suitable silane may be heptadecafluorodecyltrimethoxysilane (HTMS).

As indicated above, regions between adjacent surface protrusions 106 define surface crevices 106a that allow for impregnation of the fluorinated lubricant 112 by capillary forces. A critical contact angle of impregnation may be defined as follows, $\theta_c = \cos^{-1}[(1-\varphi)/(r-\varphi)]$, where $\varphi$ is the fraction of the projected area occupied by solid and r is the ratio of total surface area to its projected area. In examples described below with copper oxide surface protrusions functionalized with a silane, $\theta_c \approx 85°$, $\varphi \approx 0.023$, and $r \approx 10$. For successful impregnation, the intrinsic contact angle of the lubricant 112 on a smooth metal surface may be less than this critical angle.

When the surface tension of the working fluid and the fluorinated lubricant is comparable, a lower viscosity lubricant results in easier droplet shedding, which may lead to better heat transfer performance from the lubricant-impregnated surface. However, if the viscosity of the lubricant is too low, the lubricant-impregnated surface can degrade quickly through lubricant drainage. Accordingly, it is believed that a viscosity in the range from 400 mPa·s to 6000 mPa·s is suitable for the fluorinated lubricant; below 400 mPa·s, the lubricant may be susceptible to drainage, while above 6000 mPa·s the lubricant may resist droplet shedding. For this reason, lower viscosities may be preferred, such as in a range from about 400 mPa·s to about 4000 mPa·s, or in a range from about 400 mPa·s to about 1000 mPa·s. Also, it may be beneficial for the fluorinated lubricant to have a low surface energy and vapor pressure. For example, a suitable fluorinated lubricant may have a liquid density p in a range from about 1800 kg/m³ to about 2000 kg/m³, a low surface tension γ in a range from about 10 mN/m to about 30 mN/m, and/or a vapor pressure $P_{vap}$ no greater than about $1 \times 10^{-7}$ kPa.

The fluorinated lubricant may comprise a perfluoropolyether (PFPE) oil, which may have a branched or linear chemical structure. The PFPE oil may be a commercially available Krytox™ or Fomblin® PFPE oil. The PFPE oil may comprise a low molecular weight fluorine end-capped homopolymer of hexafluoropropylene epoxide, with a chemical structure as shown:

where n=10-60, as indicated for Krytox™ PFPE oils.
The polymer chains may be completely saturated and contain only the elements C, O, and F; preferably no hydrogen (H) is present. On a weight basis, the PFPE oil may contain about 22% carbon, about 9% oxygen, and about 69% fluorine. Alternatively, the PFPE oil may have the following chemical structure:

as indicated for Fomblin® Y PFPE oils. The Chemical Abstracts Services (CAS) Registry number for Krytox™ is 60164-51-4 and the CA index name is oxirane, trifluoro (trifluoromethyl)-, homopolymer; the CAS Registry number for Fomblin® Y is 69991-67-9, and the linear formula is $CF_3O[-CF(CF_3)CF_2O-]_x(-CF_2O-)_yCF_3$. Exemplary Krytox™ and Fomblin® PFPE oils that may be suitable for use as the fluorinated lubricant include Krytox™-VPF 1525, which has an average molecular weight of 3470, Krytox™-VPF 16256, which has an average molecular weight of 9400, and Fomblin®-Y25/6, which has an average molecular weight of 3300.

The impregnated fluorinated lubricant may create a chemically homogenous and atomically smooth interface for both deposited and condensing droplets of the working fluid, facilitating droplet shedding. Advantageously, the fluorinated lubricant is immiscible with the working fluid. It is also beneficial for the fluorinated lubricant to comprise a spreading coefficient $S_{ol}$ of less than 0 with respect to the working fluid, as discussed in greater detail below.

Figure 3:
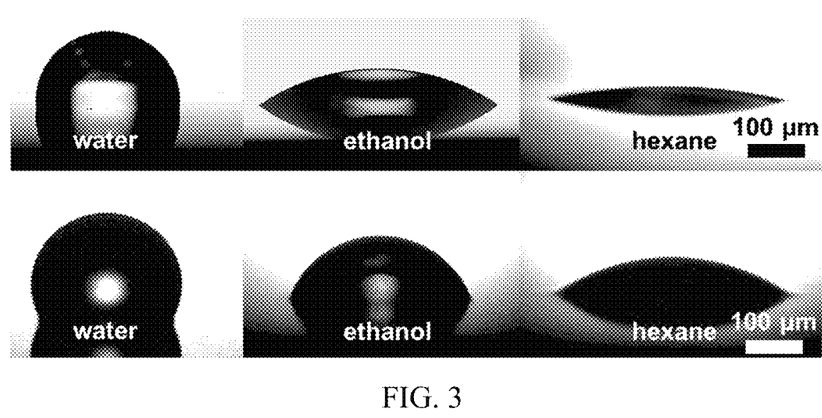
FIG. 3 shows water, ethanol and hexane droplets in the apparent advancing state on a smooth hydrophobic copper surface (top images) and a lubricant-impregnated copper oxide surface (LIS K1525) (bottom images).

The working fluid may be an aqueous or organic fluid. For example, the working fluid may comprise water, alcohols, aliphatic and aromatic hydrocarbons, or mixtures thereof. Particular examples include ethanol, isopropyl alcohol, pentane, hexane, xylene, and/or toluene. The working fluid may be a low-surface-tension working fluid (e.g., having a surface tension as low as about 15 mN/m). The working fluid may comprise dissolved, suspended or entrained organic and/or inorganic solids. The images of FIG. 3 show the behavior of droplets comprising water, ethanol, and hexane on smooth hydrophobic surfaces (top images) in comparison with droplets comprising water, ethanol, and hexane, respectively, on lubricant-impregnated surfaces including a fluorinated lubricant, specifically, Krytox®-VPF 1525 (bottom images).

As found from experiments described below, when the lubricant-impregnated surface is contacted with a working fluid having a surface tension in a range from about 15 mN/m to about 30 mN/m, heat transfer from the heat and mass transfer component may be improved by at least about 100%, or at least about 150%, compared to heat transfer from a conventional component not including the lubricant-impregnated surface. More specifically, when the lubricant-impregnated surface is contacted with a working fluid such as ethanol, xylene or hexane, a steady-state condensation heat transfer coefficient $h_c$ of at least about 6 kW/m²K may be achieved over a range of vapor pressures.

Similarly, it is expected that, when the lubricant-impregnated surface is contacted with a working fluid comprising dissolved solids, initiation of fouling of the heat and mass transfer component may be delayed significantly, such that fouling is reduced by as much as 97% over the same time duration compared to a conventional component not including the lubricant-impregnated surface.

A method of fabricating the lubricant-impregnated surface described above is also set forth in this disclosure. Simple and cost-effective, the method may be readily scaled-up for large-size components and/or high volume manufacturing. The method includes cleaning a thermally conductive substrate as described below to form a cleaned substrate, and then exposing the cleaned substrate to hot water or a hot alkaline solution to form a thermally conductive substrate having nanostructured surface protrusions. A hydrophobic species is deposited on the nanostructured surface protrusions to form hydrophobic surface features that are then impregnated with a fluorinated lubricant. In other words, the fluorinated lubricant is applied to or coated on the hydrophobic surface features, and impregnation occurs by capillary forces. Preferably, the lubricant has a viscosity in a range from 400 mPa·s to 6000 mPa·s. Thus, a lubricant-impregnated surface may be formed on a heat and mass transfer component.

The cleaning may comprise exposing the thermally conductive substrate to one or more of the following fluids: acetone, an alcohol, de-ionized (DI) water. The exposure may entail immersion (e.g., by submersion) of the thermally conductive substrate in the fluid(s) for a suitable time duration, such as at least one minute, and typically tens of minutes (e.g., from about 1 minute to about 60 minutes). For example, the thermally conductive substrate may be successively exposed to acetone, ethanol, isopropanol, and DI water, typically for at least about one minute each. A typical time duration for each exposure is in the range from five to 15 minutes. After the cleaning, the thermally conductive substrate may optionally be exposed to an acid solution, such as hydrochloric acid, for removal of any native oxide on the surface. The cleaning and/or acid exposure is typically followed by rinsing in de-ionized water, and may optionally include drying in clean nitrogen gas.

The formation of the nanostructured surface protrusions (or "nanostructuring") may entail exposure to (e.g., immersion in) hot water or a hot alkaline solution at a temperature in a range from about 85° C. to about 95° C. Hot water may be suitable for aluminum substrates, while a hot alkaline solution may be used for copper substrates. An exemplary hot alkaline solution includes $NaClO_2$, NaOH, $Na_3PO_4 \cdot 12H_2O$, and deionized (DI) water, where the components may be at a weight ratio of 3.75:5:10:100, respectively.

Depositing a hydrophobic species on the nanostructured surface protrusions may be carried out by atmospheric pressure chemical vapor deposition (CVD) of the hydrophobic species, which may comprise a silane as described above. The atmospheric pressure CVD may be performed in an enclosed chamber containing the cleaned substrate with the nanostructured surface protrusions and a precursor solution of the hydrophobic species. Upon heating to a suitable temperature (e.g., 70-90° C.) the precursor solution may evaporate and the hydrophobic species may deposit on and attach to the nanostructured surface protrusions, forming the hydrophobic surface features. An exemplary atmospheric pressure CVD process is described below.

Once the hydrophobic surface features are formed, they may be coated with the fluorinated lubricant by, for example, dip coating or using another coating technique known in the art. As discussed above, impregnation of the fluorinated lubricant into surface crevices may be driven by capillary forces. The method may further include, after coating the hydrophobic surface features with the fluorinated lubricant, draining excess fluorinated lubricant from the hydrophobic surface features, optionally followed by drying in a gas stream (e.g., $N_2$).

As demonstrated in the examples below, stable dropwise condensation of ethanol, hexane and xylene may be achieved on hydrophobic surface features comprising surface-modified nanostructured protrusions impregnated with a fluorinated lubricant, specifically, PFPE oil. Ethanol, n-hexane and xylene were chosen as working fluids for the examples since they provide a good representation of general alcohol and hydrocarbon behavior, and their condensation performance serves as a benchmark for such molecules.

Rigorous heat transfer measurements reveal a significant enhancement, between 100% and 150%, in heat transfer coefficient and consequent condensation heat transfer flux for lubricant-impregnated surfaces, in comparison with smooth hydrophobic surfaces. Also demonstrated is that careful lubricant selection may enable long-term continuous dropwise condensation with a negligible change in heat transfer performance. Furthermore, the chemical-oxidation-based nanostructuring process used to fabricate the surfaces is believed to provide a simple, scalable, and cost-effective method to create heat and mass transfer components that are fouling-resistant and capable of sustaining dropwise condensation of low-surface-tension fluids.

Lubricant Selection

The primary criterion for lubricant-impregnated surface stability is that the lubricant and the working fluid, or condensate, are immiscible. The strong intramolecular interactions (hydrogen bonding) of water molecules in the liquid phase make it immiscible with a wide variety of lubricants, most of which are non-polar in nature. However, many low-surface-tension fluids do not have strong intramolecular forces and are non-polar in nature, which may limit the rational choice of lubricant. In order to select a suitable lubricant for ethanol and hexane, the miscibility of low-surface-tension alcohols and hydrocarbons ($\gamma$=12-30 mN/m) with lubricants having a wide range of interfacial parameters, vapor pressures ($5\times10^{-8}$-0.7 kPa) and viscosities (4-5300 mPa·s) are studied. Despite their immiscibility with water, most of the tested lubricants, in particular, silicone oils, are miscible with ethanol and hexane. Fluorinated oils are found to be immiscible with both ethanol and hexane.

In addition to the immiscibility criterion, there is a need to avoid "cloaking" of droplets by the lubricant. The lubricant on the surface can encapsulate a condensate droplet, forming a cloak around it; during condensation, such cloaked droplets are inhibited from droplet growth and shedding. The presence of cloaking can be determined by calculating the spreading coefficient of the lubricant on the condensate droplets, given by $S_{ol}=\gamma_l-\gamma_o+\gamma_{ol}$ where $\gamma_l$, $\gamma_o$, and $\gamma_{ol}$ are the liquid-vapor surface tension of the working fluid (condensate), the liquid-vapor surface tension of the lubricant, and the interfacial tension between the lubricant and the condensate, respectively. For $S_{ol}>0$, the lubricant will cloak the condensate droplets. The calculated spreading coefficient of two fluorinated lubricants, namely Krytox® VPF 1525 ("K1525," $\mu$=496 mPa·s) and Krytox® VPF 16256 ("K16256," $\mu$=5216 mPa·s) on ethanol are −4.11 and −4.83, and on hexane are −2.54 and −2.45, respectively. Hence, the desired non-cloaking condition of $S_{ol}<0$ is achieved for these fluorinated lubricants with ethanol and hexane. In fact, considering both miscibility and cloaking, the fluorinated lubricants were the only suitable candidates for the design of stable lubricant-impregnated surfaces with ethanol and hexane. Also used in the experiments is a perfluorinated lubricant (Fomblin® Y25/6; "Y25/6") which is also immiscible and non-cloaking with ethanol and hexane. Similar to the Krytox™ lubricants in chemical composition, viscosity and surface tension, the Fomblin® lubricant has linear perfluorinated molecules as compared to the branched molecules present in the Krytox™ lubricants. See Table 1 for a summary.

TABLE 1

Physical properties of working fluids at 10° C. and rationally selected lubricants at 20° C.

|  | Liquid Density, $\rho$ [kg/m$^3$] | Liquid-Vapor Surface Tension, $\gamma$ [mN/m] | Vapor Pressure, $P_{vap}$ [kPa] | Dynamic Viscosity, $\mu$ [mPa · s] |
|---|---|---|---|---|
| Working Fluid | | | | |
| Water (deionized water) | 999.7 | 74.2 | 1.23 | 1.306 |
| Ethanol (200 proof, ≥99.5%) | 789 | 23.03 | 3.11 | 1.568 |
| Hexane (n-hexane, ≥95%) | 655 | 19.39 | 10.15 | 0.352 |
| Xylene (p-xylene) | 861 | 29.37 | 0.473 | 0.716 |
| Lubricant | | | | |
| K1525 | 1900 | 19 | $1.3 \times 10^{-8}$ | 496 |
| K16256 | 1920 | 19 | $4 \times 10^{-15}$ | 5216 |
| Y25/6 | 1900 | 22 | $4.2 \times 10^{-8}$ | 524 |

The lubricant properties determine, for the working fluid on the surface, both the apparent advancing contact angle and the contact angle hysteresis, the two necessary factors for preventing working fluid film formation and promoting rigorous dropwise condensation. Dropwise condensation results for ethanol and hexane described below show that for working fluids having surface tension higher than the lubricant in the lubricant-impregnated surface, the heat transfer performance is independent of the lubricant viscosity. However, when the surface tension of the working fluid and the lubricant becomes comparable, a lower viscosity lubricant results in easier droplet shedding, leading to better heat transfer performance from the lubricant-impregnated surface. However, if the viscosity of the lubricant is too low, the lubricant-impregnated surface can degrade quickly through lubricant drainage. Generally speaking, a lubricant having a dynamic viscosity p of at least about 400 mPa·s or at least about 450 mPa·s is preferred. It may also be advantageous for the dynamic viscosity p of the lubricant to be about 6000 mPa·s or less, about 1000 mPa·s or less, or about 700 mP·s or less. For best heat transfer results, lubricants with a dynamic viscosity p in a range from 450 mPa·s to 600 mPa·s (e.g., about 500 mPa·s) may be used for heat and mass transfer components with stable and durable lubricant-impregnated surfaces. The terms "dynamic viscosity" and "viscosity" may be used interchangeably throughout this disclosure, and the values of viscosity and/or other physical properties may be determined under normal temperature (e.g., 20° C.) and/or pressure (e.g., 1 atm) conditions.

Heat Transfer Performance

To determine the overall condensation heat transfer performance, smooth hydrophobic (silane-functionalized) copper surfaces ("HP Cu") and lubricant-impregnated surfaces formed as described in the Fabrication Details section below were tested in a test chamber with controlled environment. Prior to the condensation experiments, a separate vapor generator filled with the test liquid was vigorously boiled. The test chamber was evacuated to a pressure P<4±2 Pa with a leak rate of 0.1 Pa/min after chamber isolation. Chamber pump down was done primarily to eliminate non-condensable gases which may pose an additional diffusional resistance to condensation heat transfer. During the condensation experiments, the chamber pressure and vapor generator temperature were continuously monitored to ensure saturated conditions. The surface temperature of the tube sample was independently controlled with an external water cooling loop, with the inlet and outlet temperatures continuously measured using Class A resistance temperature detectors (RTDs) to determine the overall heat flux. Typical inlet to outlet tube temperature differences ranged from 0.5 to 7.5° C. depending on the tube sample, working fluid, and vapor pressure. For all experiments, the cooling water inlet temperature was kept constant at 6±1° C. with a flow rate of 11±0.3 L/min, resulting in fully turbulent flow with Reynolds number, Re=36000.

Accordingly, condensation heat transfer performance was tested within the vapor pressure range of 3.5 kPa<$P_v$<10 kPa for ethanol and 11 kPa<$P_v$<15 kPa for hexane, which are common conditions for condensers used in industrial separation and distillation applications.

Figures 4A, 4B, 4C, 4D, 4E, 4F:
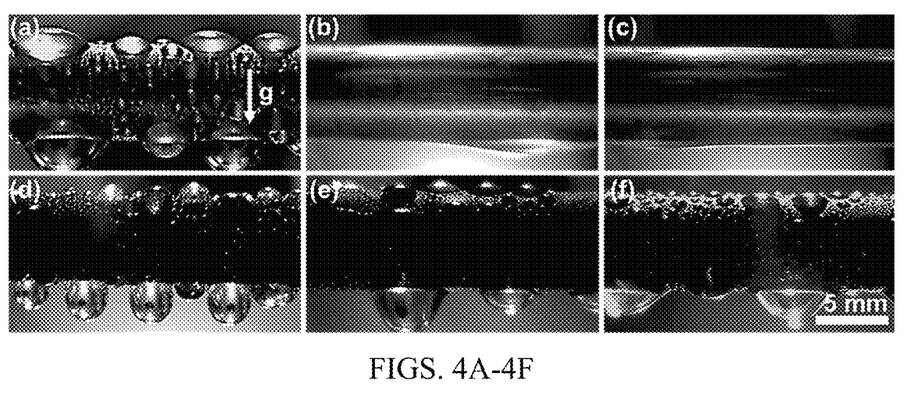

FIGS. 4A-4C show condensation of water, ethanol, and hexane respectively on the smooth hydrophobic copper tubes, and FIGS. 4D-4F show condensation of water, ethanol, and hexane respectively on copper tubes processed to have lubricant-impregnated surfaces. Table 2 below shows wetting characteristics, including intrinsic advancing ($\theta_a$), receding ($\theta_r$) contact angles and contact angle hysteresis ($\Delta\theta=\theta_a-\theta_r$), for ethanol and hexane on smooth hydrophobic copper ("HP Cu") and lubricant-impregnated surfaces including different fluorinated lubricants ("LIS K1525," "LIS K16256," and "LIS Y25/6"). Due to the intrinsic hydrophobicity of the tube surface, water vapor condensate forms discrete droplets on the outer tube surface, which grow in time before being removed by gravity, sustaining continuous dropwise condensation (FIG. 4A). However, the solid-vapor interface of the smooth HP Cu tubes does not have sufficiently low surface energy to prevent wetting by the low-surface-tension fluids, as evidenced in FIGS. 4B and 4C. As expected from the high contact angle hysteresis on the smooth HP Cu surface, ethanol (FIG. 48) and hexane (FIG. 4C) undergo filmwise condensation, limiting heat transfer due to the added thermal resistance of the thin condensate film. In contrast, as shown in FIGS. 4D-4F, condensation on the lubricant-impregnated surface fabricated with K1525 oil ("LIS K1525") provides a liquid-liquid interface between the condensate droplets and the immiscible lubricant, resulting in negligible droplet pinning, low contact angle hysteresis, and easy droplet removal.

TABLE 2

Sample wetting characteristics.

| Sample | Ethanol | | | Hexane | | |
| --- | --- | --- | --- | --- | --- | --- |
| | $\theta_a$ [°] | $\theta_r$ [°] | $\Delta\theta$ [°] | $\theta_a$ [°] | $\theta_r$ [°] | $\Delta\theta$ [°] |
| HP Cu | 36.5 ± 1.2 | 23.4 ± 3.7 | 13.1 ± 3.9 | 12.6 ± 2.8 | ≈0 | 12.6 ± 2.8 |
| LIS K1525 | 71.1 ± 2.4 | 69.3 ± 2.6 | 1.8 ± 3.5 | 45.7 ± 2.3 | 42.1 ± 2.5 | 3.6 ± 3.4 |
| LIS K16256 | 67.8 ± 1.9 | 65.2 ± 3.2 | 2.6 ± 3.7 | 44.1 ± 2.6 | 40.7 ± 2.8 | 3.4 ± 3.8 |
| LIS Y25/6 | 62.4 ± 2.3 | 59.7 ± 2.6 | 2.7 ± 3.5 | 37.4 ± 3.2 | 34.6 ± 2.7 | 2.8 ± 4.2 |

For all condensation heat transfer experiments, the rate of condensation increases with increasing $P_v$. Prior to utilizing ethanol and hexane, the heat transfer measurement method was benchmarked with steam as the working fluid. The measurements are in excellent agreement with prior steam condensation results for both dropwise and filmwise modes of condensation on horizontal tubes.

Figure 5A:
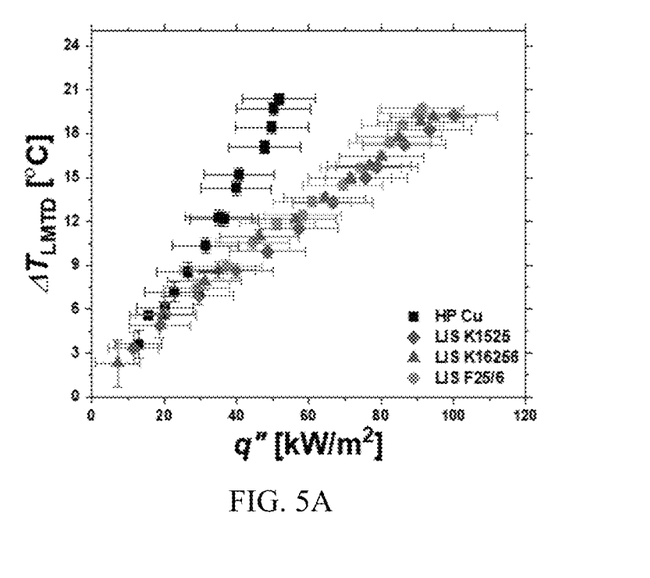
FIGS. 5A and 5B show experimental steady state log mean water to vapor temperature difference ($\Delta T_{LMTD}$) as a function of overall surface heat flux (q") for (5A) ethanol and (5B) hexane condensation on smooth hydrophobic copper surfaces (HP Cu, filmwise) and lubricant-impregnated surfaces (LIS, dropwise). Rapid droplet removal due to dropwise condensation results in the highest heat fluxes for the LIS samples (for overall surface heat flux (q") as a function of saturated vapor pressure ($P_v$). Error bars indicate the propagation of error associated with the fluid inlet and outlet temperatures (±0.25 K), pressure measurement (±1%), and flow rate (±1%).
Figure 5B:
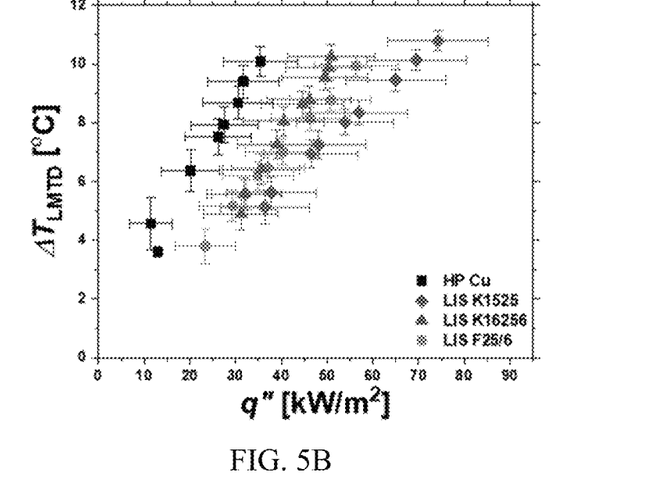

FIGS. 5A and 5B show the measured steady overall condensation heat flux (q") as a function of log mean vapor-to-liquid temperature difference ($\Delta T_{LMTD}=[(T_v-T_{in})-(T_v-T_{out})]/\ln[(T_v-T_{in})/(T_v-T_{out})]$, where $T_v$, $T_{in}$, and $T_{out}$ are the vapor, cooling water inlet, and cooling water outlet temperatures) for ethanol and hexane, respectively. To maximize the tube internal heat transfer coefficient, the cooling water mass flow rate was held constant at 11±0.3 L/min for all experiments (1.02<S≤1.7, 7<$T_s$<25° C., where S is the supersaturation and $T_s$ is the extrapolated tube surface temperature. The overall heat transfer coefficient (HTC), $\overline{U}=q"/\Delta T_{LMTD}$ was calculated from the measured values of condensation heat flux (q") and calculated $\Delta T_{LMTD}$ values.

Knowing the thermal resistances of the internal tube single-phase forced convection and radial conduction through the copper tube wall, the steady-state condensation heat transfer coefficient at the tube outer surface, $h_c$, was calculated. To validate the results, filmwise condensation was modeled using the classical Nusselt theory for tube condensation. The filmwise condensation results (square symbols in FIGS. 5A-5D) of ethanol and hexane on smooth hydrophobic copper (HP Cu) surfaces are in excellent agreement with Nusselt theory (dotted line).

As expected, for ethanol and hexane, the HP Cu tube showed filmwise behavior with the lowest overall and condensation HTC ($\overline{U}_{filmwise} \approx 2.87 \pm 0.4$ kW/m$^2$K, $h_{c,filmwise} \approx 3.38 \pm 1.3$ kW/m$^2$K for ethanol and $\overline{U}_{filmwise} \approx 3.43 \pm 0.5$ kW/m$^2$K, $h_{c,filmwise} \approx 3.93 \pm 1.07$ kW/m$^2$K for hexane) due to the thin condensate film acting as the dominant thermal resistance to heat transfer. The steady filmwise condensation HTC ($h_{c,filmwise}$) decreased with increasing $P_v$ (FIGS. 5C and 5D) due to the build-up of the condensate on the tube outer surface, increasing the overall thermal resistance.

Figure 5C:
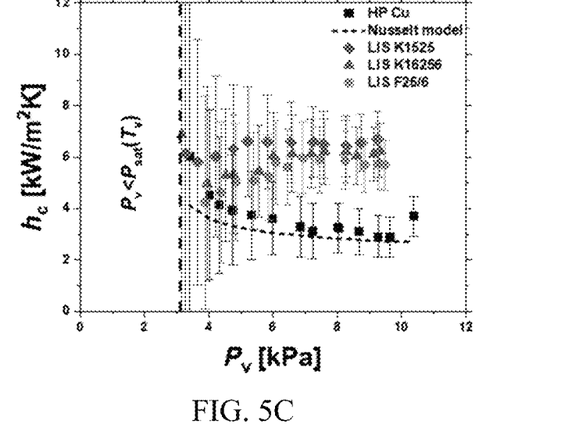
FIGS. 5C-5E show experimental and theoretical steady state condensation coefficient ($h_c$) as a function of saturated vapor pressure ($P_v$) for (5C) ethanol, (5D) hexane and (5E) xylene condensation on HP Cu (filmwise) and LIS (dropwise) surfaces. Error bars indicate the propagation of error associated with the fluid inlet and outlet temperatures (±0.25 K), pressure measurement (±1%), and flow rate (±1%). The theoretical predictions (dotted lines) were obtained from the classical Nusselt filmwise condensation model on tubes.
Figure 5D:
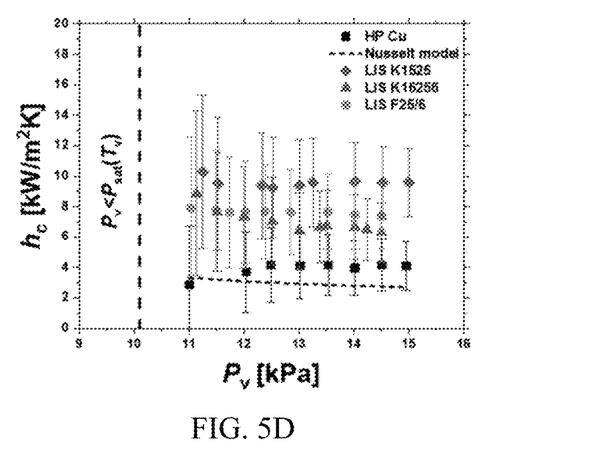
Figure 5E:
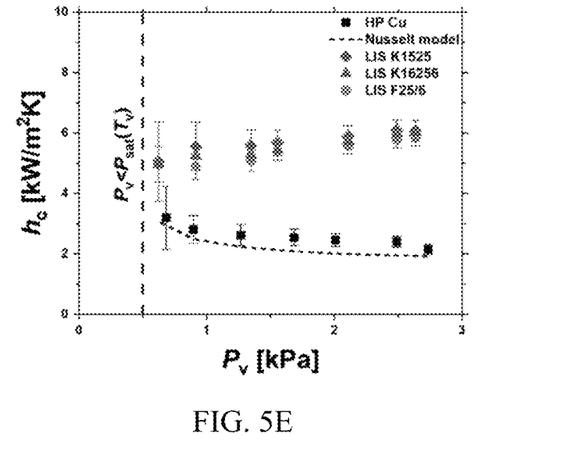

In contrast, both ethanol and hexane exhibited steady dropwise condensation behavior on the tubes having lubricant-impregnated surfaces (LIS). The heat transfer performance during dropwise condensation of ethanol and hexane on the LIS tubes substantially exceeded that of filmwise condensation ($\overline{U}_{dropwise} \approx 4.8 \pm 0.4$ kW/m$^2$K, $h_{c,dropwise} \approx 6.23 \pm 0.7$ kW/m$^2$K for ethanol and $\overline{U}_{dropwise} \approx 6.9 \pm 0.9$ kW/m$^2$K, $h_{c,dropwise} \approx 9.4 \pm 1.6$ kW/m$^2$K for hexane) as shown in FIGS. 5C and 5D, respectively. The three different lubricant-impregnated surfaces with the three separate lubricants (LIS K1525, LIS K16256, and LIS Y25/6) gave similar enhanced heat transfer performance for ethanol and hexane condensation, having a variance of ±11% and ±30% in $\overline{U}_{dropwise}$ for ethanol and hexane, respectively, and ±13% and ±40% in $h_{c,dropwise}$ for ethanol and hexane, respectively. The dropwise condensation heat transfer enhancement is more pronounced at higher $P_v$, where filmwise HTC decreases due to increasing condensate film thickness while dropwise HTC increases due to nucleation site activation at higher supersaturation.

The enhanced heat transfer performance for dropwise condensation of hexane on all three LIS tubes compared to filmwise condensation on the smooth hydrophobic Cu tube is as pronounced as observed with ethanol. Referring to FIG. 5D, the K1525 infused LIS tube (LIS K1525) shows the best performance. The $h_{c,dropwise}$ is higher than $h_{c,filmwise}$ by 150% for LIS K1525, 100% for LIS Y25/6, and 50% for LIS K16256. Interestingly, although all three LIS tubes have a variance of ±13% in $h_{c,dropwise}$ for ethanol, statistically significant differences in $h_{c,dropwise}$ for hexane are observed.

To explain the variance, both the lubricant and hexane thermophysical properties (Table 1) are examined along with the contact angle hysteresis of condensate droplets on the lubricant-impregnated surfaces (Table 2). For ethanol, the intrinsic advancing contact angle ($\theta_a$) on the three lubricant-impregnated surfaces is 62.4°<$\theta_a$<71.1°, with a maximum contact angle hysteresis, $\Delta\theta = \theta_a - \theta_r \approx 2.7°$ (Table 2). The low $\Delta\theta < 2.7°$ and moderate $\theta_a \approx 65°$ may ensure stable dropwise condensation for all three lubricant-impregnated surfaces with minimal expected heat transfer results. However, for hexane, $\theta_a$ on the three lubricant-impregnated surfaces is 37.4°<$\theta_a$<45.7°, with a maximum $\Delta\theta \approx 3.6°$ (Table 2), resulting in condensation close to the dropwise-to-filmwise transition. Dropwise condensation stability is governed by the $\Delta\theta$-mediated droplet shedding (sliding) length scale. For droplets having relatively low $\theta_a$(<50°), as observed for hexane (Table 1), the droplet shedding length scale can be larger than required to reside in the capillary-dominated regime. For surfaces having a combination of elevated $\Delta\theta$ and relatively low $\theta_a$, the droplet shedding length scale can become so large that capillarity ceases to govern the droplet dynamics, giving way to the gravity-dominated regime (Bo>>1, where Bo is the $\theta_a$ dependent departing droplet Bond number, Bo=$\Delta\rho g D^2/\gamma$), puddle formation on the surface, and filmwise condensation.

In these experiments, although the hexane underwent dropwise condensation on all three LIS tubes, K1525 has the advantageous properties of having the largest $\theta_a$ to ensure dropwise stability owing to its low surface tension ($\gamma \approx 19$ mN/m), with a corresponding low lubricant viscosity ($\mu$, Table 1) to ensure easy droplet shedding and contact-line motion during coalescence. The good dropwise condensation stability makes it the most stable lubricant in these experiments for hexane dropwise condensation heat transfer, resulting in $\overline{U}_{dropwise} \approx 6.9 \pm 0.9$ kW/m$^2$K and $h_{c,dropwise} \approx 9.6 \pm 1.5$ kW/m$^2$K.

Although deposited hexane droplets on the LIS Y25/6 show the lowest $\theta_a$ due to high lubricant surface tension ($\gamma \approx 25$ mN/m, Table 1), the droplets have the lowest $\Delta\theta$ owing to the high chemical homogeneity of linear fluorinated Fomblin vacuum oils. While low $\Delta\theta$ ensures good dropwise condensation stability, condensation of hexane on LIS Y25/6 is in closer proximity to the dropwise-to-filmwise transition than LIS K1525. Correspondingly, a slightly lower heat transfer performance owing to the presence of transient quasi-dropwise condensation (temporary liquid film formation) on the surface is observed, with $\overline{U}_{dropwise} \approx 5.7 \pm 0.4$ kW/m$^2$K and $h_{c,dropwise} \approx 7.5 \pm 0.7$ kW/m$^2$K.

Lastly, the LIS K16256, although having similar hexane wetting behavior with LIS K1525 (Table 2), has a viscosity one order of magnitude higher than both LIS alternatives (Table 1). The elevated viscosity shows an alternate mechanism for heat transfer impediment, resulting in slow droplet coalescence and temporary film formation during hexane condensate droplet coalescence. The high viscosity of the K16256 lubricant may act to dampen the motion of the coalescing droplet contact line, resulting in larger droplet departure radii, and transient films having irregular shape. Furthermore, the additional shear stress between the lubricant layer and the condensate droplets may hinder droplet removal, increasing the residence time of condensate droplets on the LIS tube before being removed by gravity, as compared to lower viscosity K1525 and Y25/6 lubricants. The slower droplet removal from the tube decreases the rate of re-nucleation, lowering the condensation rate and heat transfer performance, resulting in $\overline{U}_{dropwise} \approx 5.3 \pm 1.1$ kW/m$^2$K and $h_{c,dropwise} \approx 6.8 \pm 1.8$ kW/m$^2$K. Despite having the lowest heat transfer performance among the three LISs, K16256 LIS promoted continuous dropwise condensation of hexane and showed a 50% higher $h_{c,dropwise}$ compared to conventional filmwise condensation per FIG. 5D.

The heat transfer performance during dropwise condensation of hexane on all three tubes having lubricant-impregnated surfaces is higher than that of ethanol condensation. The $h_{c,dropwise}$ for hexane is higher than $h_{c,dropwise}$ for ethanol by 45% for LIS K1525, 35% for LIS Y25/6, and 15% for LIS K16256. The higher condensation HTC can be attributed to the lower intrinsic advancing contact angle ($\theta_a$) of hexane (37.4°<$\theta_a$<45.7°) compared to ethanol (62.4°<$\theta_a$<71.1°) on the three lubricant-impregnated surfaces. The lower contact angle results in a larger contact area between the hexane condensate droplets and the lubricant-impregnated surface, thereby lowering the droplet conduction resistance and increasing heat transfer.

Durability and Long-Term Performance

Durability and long term performance of functional coatings are of utmost importance for their acceptance in industrial applications. For lubricant-impregnated surfaces, drainage of the lubricant from within the surface nanostructures may be a concern. To test the durability and heat transfer performance of the lubricant-impregnated surfaces over time, in initial experiments, continuous condensation with ethanol and hexane was carried out for seven hours, based on the capacity of the vapor generator.

Figure 6:
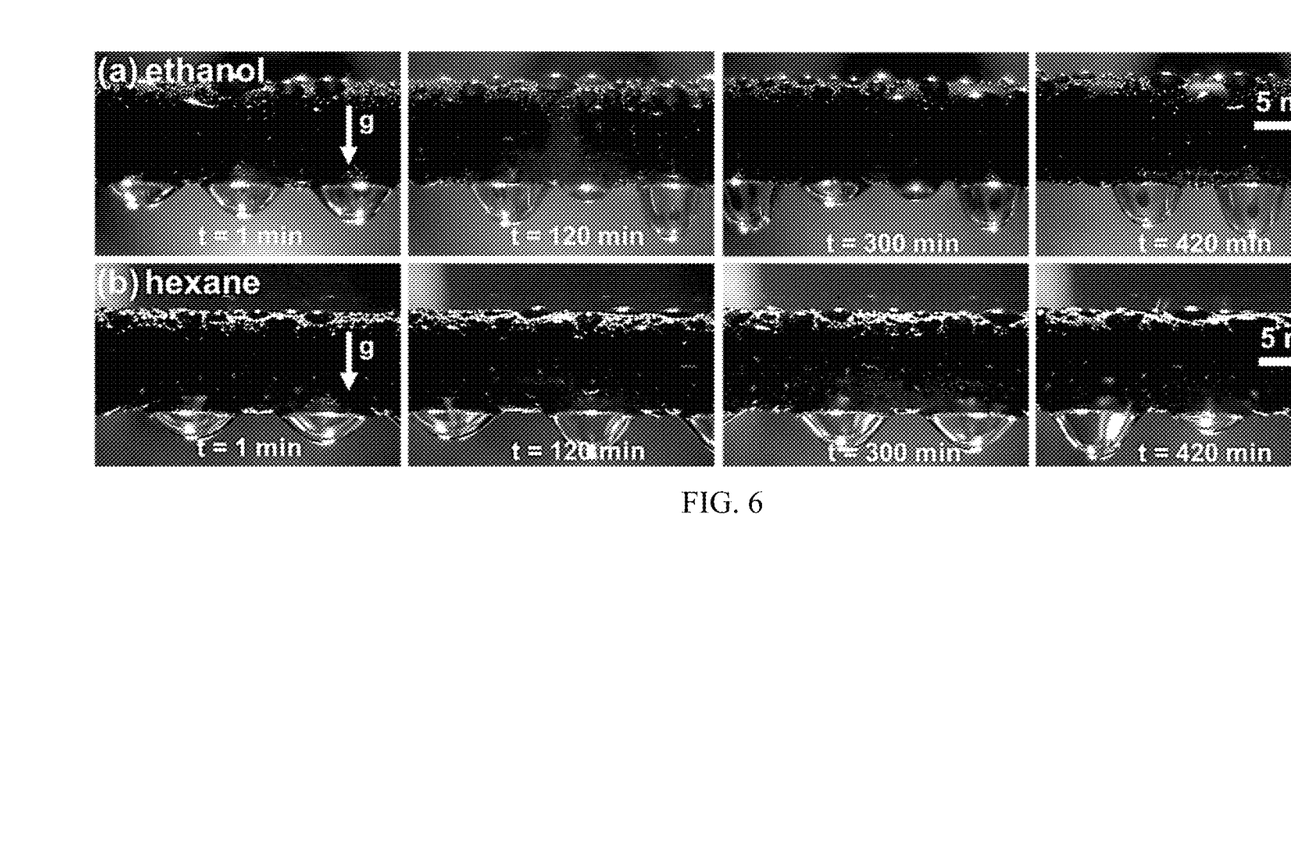
FIG. 6 shows time-lapse sequence of images for both ethanol (top images) and hexane (bottom images) condensation on LIS K1525 over seven hours. Condensation conditions: $\Delta T_{LMTD}$=16° C., q"=80 kW/m$^2$ for ethanol, and $\Delta T_{LMTD}$=9° C., q"=65 kW/m$^2$ for hexane, $P_v$=8 kPa for ethanol and $P_v$=14 kPa for hexane.
Figure 7A:
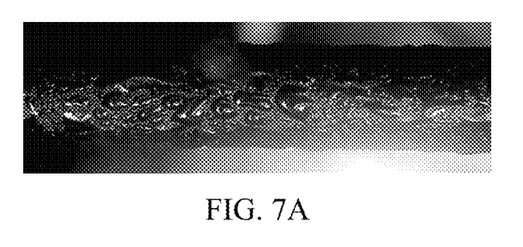
FIGS. 7A-7D show the condensation mode (dropwise or filmwise) at a time of 2805 hours during continuous ethanol condensation experiments on LIS K1525, LIS K16256, LIS Y25/6, and superhydrophobic CuO, respectively.
Figure 7B:
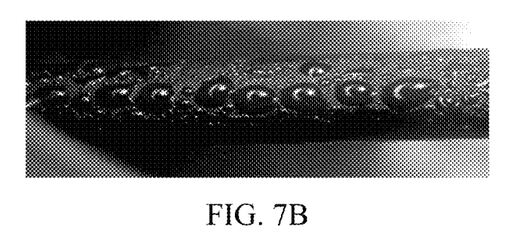
Figure 7C:
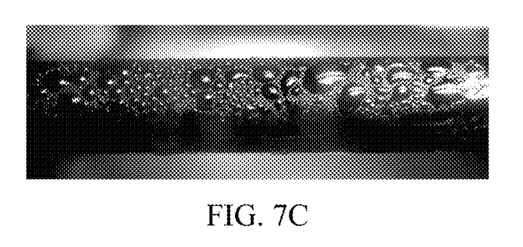
Figure 7D:
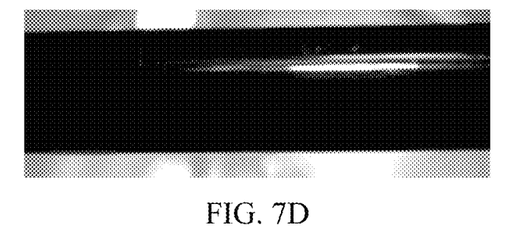

FIG. 6 shows time-lapse sequence of images for both ethanol (top images) and hexane (bottom images) condensation on LIS K1525, showing dropwise condensation for the entire time duration of 420 minutes. Similar effects are observed with LIS K16256 and LIS Y25/6, showing that lubricant drainage from the lubricant-impregnated surfaces is negligible over at least a seven-hour time scale, and thus dropwise heat transfer performance can be sustained over long time periods. The results show that shear drainage and lubricant depletion do not hinder the condensation performance of the lubricant-impregnated surfaces over reasonable time scales (at least ten hours). It is believed that the usage of sufficiently high viscosity fluorinated lubricants (400-6000 mPa·s) ensure prolonged dropwise condensation of ethanol and hexane. The three lubricants employed herein have the following properties, in summary: Krytox® VPF 1525 ($\mu$=496 mPa·s, $\nu$=250 cSt), Krytox® VPF 16256 ($\mu$=5216 mPa·s, $\nu$=2560 cSt), and Fomblin® Y25/6 ($\mu$=524 mPa·s, $\nu$=276 cSt). It should be noted that the optimal lubricant viscosity range for best heat transfer performance of the lubricant-impregnated surface may also depend on the working fluid and its properties.

In further experiments, the durability of the lubricant-impregnated surfaces was evaluated over much longer time scales (>120 days) during continuous ethanol condensation. The lubricant-impregnated surfaces showed no visible degradation and sustained dropwise condensation for the duration of the experiments (over 2880 hours).

The long-term durability experiments were carried out in a vacuum chamber designed to test the durability of multiple specimens (e.g., tubes with lubricant-impregnated surfaces) simultaneously in conditions similar to those encountered in an industrial condenser, for periods of up to several months. The chamber was initially filled with liquid ethanol (one-third the total volume), with wrapped tape heaters boiling the liquid. The tubes were positioned close to the top of the chamber, with cooling water from a chiller pump flowing internally through them. Vapor (ethanol in these experiments) was generated inside the chamber, and the vapor condensed upon coming into contact with the cold external tube surfaces. A camera was installed to visualize the condensation on the tubes inside the chamber and determine if and when the condensation mode transitions from dropwise to filmwise. A data acquisition system was installed to record the thermocouple reading, pressure of the vapor and cooling liquid flow rate. The coolant (water) flow rate and heater settings were adjusted such that the cumulative rate of condensation from all surfaces matched with the rate of liquid (ethanol) boiling, thereby maintaining steady saturation conditions (vapor pressure) inside the chamber. For ethanol condensation, the conditions employed were $T_{chiller}$=5° C., $T_{sat}$=18° C. and $P_{sat}$=5.15 kPa.

FIGS. 7A-7D show the condensation mode at a time of 2805 h (nearly 117 days) during the continuous ethanol condensation experiments for LIS K1525, LIS K16256, LIS Y25/6, and superhydrophobic CuO, respectively. Each of the lubricant-impregnated surfaces (LIS K1525, LIS16256 and LIS Y25/6) showed dropwise condensation behavior over the entire duration of the long-term experiments, while the superhydrophobic CuO surface showed filmwise condensation from the beginning. Notably, a lubricant-impregnated surface comprising Krytox™ GPL 101, a general purpose PFPE oil with a much lower dynamic viscosity (p=33 mPa·s) than the other lubricants, exhibited a transition from dropwise to filmwise condensation behavior within 10 days during the continuous ethanol condensation experiments.

INDUSTRIAL APPLICABILITY

The findings reported here have important implications for the potential development of durable, scalable and robust surfaces for dropwise condensation of low-surface-tension fluids. In particular, condensation of refrigerants is a widely used industrial process where surfaces with higher heat transfer coefficients could materially reduce energy consumption. The demonstration of stable dropwise condensation of ethanol and hexane shows that lubricant-impregnated surfaces may be a potential solution for creating refrigerant-repellant surfaces. Furthermore, the presence of 1 to 5% oil content in commercial refrigeration systems stemming from compressor lubricant entrainment presents a unique opportunity to develop closed-cycle lubricant impregnated condenser surfaces that can be replenished with compressor lubricant at steady state. Indeed, at the condenser inlet of an air-conditioning system, the refrigerant enters as a superheated vapor with entrained low-vapor-pressure compressor oil droplets which can deposit on the condenser surface, presenting an opportunity to convert a system penalty (oil entrainment) into a benefit.

In addition to refrigeration, systems that use non-refrigerant low-surface-tension process fluids, such as chemical plants, natural gas production facilities, biomass combustion units, and the food industry, may benefit significantly from dropwise condensation with respect to condenser size reduction and energy cost savings. This work shows for the first time that rigorous sustainable dropwise condensation can be achieved for low-surface-tension fluids on lubricant-impregnated surfaces, attaining 150% higher heat transfer coefficients compared to filmwise condensation on conventional smooth hydrophobic surfaces.

In addition to enhancing condensation heat transfer, the lubricant-impregnated surface may also inhibit industrial-scale process fouling and scale buildup, a significant concern in many industrial heat transfer applications. The synergy offered by anti-fouling and enhanced heat transfer has significant potential to dramatically enhance both performance and longevity of heat and mass transfer components.

Fabrication Details

Tube Cleaning Procedure:

The copper tubes used in these experiments were systematically cleaned prior to testing. All tubes were interfaced with a female ¼" stainless steel Swagelok tube fitting on each end and capped with a ¼" stainless steel Swagelok nut. Capping of the tubes ensured that no oxidation or functionalization occurred on the internal surface to keep the same cooling water flow conditions. Once capped, the tubes were cleaned by subsequently submersing them in acetone, ethanol, isopropyl alcohol (IPA) and de-ionized (DI) water for about 10 minutes each at room temperature in separate custom-made polyvinyl chloride (PVC) troughs. After rinsing the tubes in DI water and drying in a clean nitrogen stream, the tubes were dipped into a 2.0 M hydrochloric acid solution for 10 minutes to remove the native oxide film on the surface. Finally, the tubes were rinsed three times with DI water and dried with a clean nitrogen stream.

Fabrication of CuO Nanostructures:

Nanostructured copper oxide (CuO) surface protrusions were formed on the cleaned copper samples by immersing the tubes in a hot (90±3° C.) alkaline solution composed of $NaClO_2$, NaOH, $Na_3PO_4.12H_2O$, and DI water (3.75:5:10:100 wt %). The oxidation process led to the formation of a thin (300 nm) $Cu_2O$ layer that reoxidized to form sharp, knife-like CuO protrusions (h≈1 µm, solid fraction φ≈0.023, and roughness factor r≈10).

Silane Deposition: The nanostructured CuO and smooth Cu tubes were functionalized using atmospheric pressure chemical vapor deposition of a fluorinated silane (heptadecafluorodecyltrimethoxysilane, abbreviated as HTMS, Sigma-Aldrich). The sample tubes were placed inside a 24" diameter, 36" tall, barrel wrapped with tape heaters on the outside to maintain a steady temperature. Along with the tube samples, 10 mL of a HTMS-toluene solution (5% v/v) was placed in a small glass vial inside the barrel. The barrel was sealed with a lid and heated to 80° C. at atmospheric pressure. The barrel was covered with insulation and properly sealed to prevent vapor from escaping. The tube sample was oriented vertically leaning on the walls of the barrel, and left in the barrel for 3 hours to add a monolayer of silane molecules on the smooth and structured surfaces.

Lubricant-Impregnated Surfaces:

The functionalized nanostructured CuO tube samples were dip coated to infuse the surface with the lubricant of choice. The tube samples were immersed in the lubricant for 10 mins using the PVC troughs described above. The tube samples were then removed and left in a vertical position for 24 hours in ambient conditions to allow gravitational drainage of excess lubricant. The LIS sample tubes were then dried in a clean nitrogen stream and tested.

To study the fabricated tube surface morphology using SEM and focused ion beam (FIB) imaging, and to measure contact angles using a microgoniometer, additional flat small samples (1"×1") were fabricated using the same procedures described above.

Heat Transfer Calculations

Overall Heat Transfer Coefficient (U):

The overall condensation heat transfer rate was calculated using an energy balance on cooling water flowing inside the tube sample, as shown in equation 1

$$Q = \dot{m}c_p(T_{out} - T_{in}), \quad (1)$$

where Q is the overall condensation heat transfer rate, $\dot{m}$ is the cooling water mass flow rate, $c_p$ is the liquid water specific heat, and $T_{out}$ and $T_{in}$ are the outlet and inlet temperatures, respectively. The overall heat transfer rate (Q) was then balanced with the overall heat transfer coefficient, $\overline{U}$ as:

$$\dot{m}c_p(T_{out} - T_{in}) = \overline{U}A_o \Delta T_{LMTD}, \quad (2)$$

where $A_o$ is the tube outer surface area ($A_o = \pi d_{OD} L$ where $d_{OD}=6.35$ mm, L=76.2 cm) and $\Delta T_{LMTD}$ is the log mean temperature difference defined by:

$$\Delta T_{LMTD} = \frac{(T_v - T_{in}) - (T_v - T_{out})}{\ln\left[\frac{(T_v - T_{in})}{(T_v - T_{out})}\right]}, \quad (3)$$

where $T_v$ is the temperature of the surrounding saturation vapor inside the chamber ($T_v = T_{sat}(P_v)$). The overall heat transfer coefficient, which is only a function of experimentally obtained parameters, can thus be calculated as:

$$\overline{U} = \frac{\dot{m}c_p(T_{out} - T_{in})}{A_o \Delta T_{LMTD}}. \quad (4)$$

Condensation Heat Transfer Coefficient ($h_c$):

The calculated $\overline{U}$ is a measure of the overall heat transfer performance from the vapor to the cooling water. It includes the convective resistances on the inner and outer walls and the conductive resistance through the copper wall. Further calculations were performed to isolate the thermal resistance on the outer wall to quantify the condensation heat transfer coefficient, $h_c$, as measured from the vapor to the tube outer surface.

To extract $h_c$, the conductive resistance was calculated using the thermal conductivity and the internal resistance was calculated by estimating the internal heat transfer coefficient. The water-side heat transfer coefficient ($h_i$) was estimated by the Petukhov correlation (shown in equations 5-7), which is relevant to the coolant flow conditions and has an accuracy of about 6%.

$$h_i = \frac{k_i}{d_{ID}} \frac{\left(\frac{f}{8}\right) RePr}{\left(1.07 + 12.7\left(\frac{f}{8}\right)^{\frac{1}{2}}(Pr^{\frac{2}{3}} - 1)\right)} \left(\frac{\mu_b}{\mu_s}\right)^n. \quad (5)$$

$$Re = \frac{\rho v d_{ID}}{\mu}. \quad (6)$$

$$f = [0.79 \ln(Re) - 1.64]^{-2}. \quad (7)$$

In the above equations, f is the pipe friction factor, Re is the cooling water Reynolds number, Pr is the cooling water Prandtl number, ρ is the cooling water density, $k_i$ is the cooling water thermal conductivity, and $\mu_b$ and $\mu_s$ are the cooling water dynamic viscosities at the bulk and tube wall temperatures, respectively.

Knowing $h_i$, a closed form solution can be obtained for $h_c$ by combining all the relevant thermal resistances (internal convection and radial conduction through the tube wall):

$$h_c = \left(\frac{1}{\overline{U}} - \frac{A_o}{A_i h_i} - \frac{A_o \ln\left(\frac{d_{OD}}{d_{ID}}\right)}{2\pi L k_t}\right)^{-1}, \quad (8)$$

where $A_o$ is the tube outer surface area ($A_o = \pi d_{OD} L$), $A_i$ is the internal tube surface area ($A_i = \pi d_{ID} L$), L is the length of the tube sample, and $k_t$ is the thermal conductivity of the wall ($k_{Cu} = 401$ W/m-K).

Tube Surface Temperature ($T_s$):

The tube surface outer temperature, $T_s$, was used to calculate the supersaturation for each test condition. The outer wall temperature was calculated using the total heat transfer rate and the conductive and water-side convective thermal resistances, as shown in equation 9:

$$Q = \frac{T_s - T_{avg}}{\frac{1}{h_i A_i L} + \frac{\ln\left(\frac{d_{OD}}{d_{ID}}\right)}{2\pi L k_t}}, \quad (9)$$

where $T_{avg}=(T_{out}-T_{in})/2$. Rearranging Eq. 9, the tube surface temperature can be calculated as:

$$T_s = T_{avg} + \dot{m}c_p(T_{out} - T_{in})\left[\frac{1}{h_i A_i L} + \frac{\ln\left(\frac{d_{OD}}{d_{ID}}\right)}{2\pi L k_t}\right]. \quad (10)$$

Finally, the supersaturation, S, defined as the ratio of the vapor pressure to the saturation pressure corresponding to the tube sample surface temperature is given by:

$$S = \frac{P_v}{P_{sat}(T_s)}. \quad (11)$$

Filmwise Condensation Model:

To model filmwise condensation of steam, ethanol, and hexane on tube samples, the classical Nusselt model was used, given by:

$$h_{c,filmwise} = 0.729\left[\frac{g\rho_l(\rho_l - \rho_v)k_l^3 h'_{fg}}{\mu_l d_{OD}\Delta T}\right]^{0.25}, \quad (12)$$

$$h'_{fg} = h_{fg} + 0.68c_{p,l}\Delta T, \quad (13)$$

where g is the acceleration due to gravity (g=9.81 m/s²), $\rho_v$ is the vapor density, $\rho_l$ is the condensate liquid density, $\mu_l$ is the condensate liquid dynamic viscosity, $h_{fg}'$ is the modified latent heat of vaporization accounting for the change in specific heat of the condensate and $c_{p,l}$ is the condensate liquid specific heat.

Error Analysis:

The uncertainty of the overall heat transfer coefficient, $\overline{U}$, was calculated by propagating the instrument uncertainty of each measured variable (Table 3), as shown in equation 14.

$$E_{\overline{U}} = \overline{U}\sqrt{\left(\frac{E_{\dot{m}}}{\dot{m}}\right)^2 + \left(\frac{E_{(T_{out}-T_{in})}}{(T_{out}-T_{in})}\right)^2 + \left(\frac{-E_A}{A}\right)^2 + \left(\frac{-E_{\Delta T_{LMTD}}}{\Delta T_{LMTD}}\right)^2}. \quad (14)$$

As the condensation heat transfer coefficient, $h_c$ is a product of powers, the error is determined as a function of the first partial derivatives of $h_c$ with respect to its components:

$$E_{h_c} = h_c\sqrt{\left(\frac{\partial h_c}{\partial h_i}\frac{E_{h_i}}{h_i}\right)^2 + \left(\frac{\partial h_c}{\partial \overline{U}}\frac{E_{\overline{U}}}{\overline{U}}\right)^2}, \quad (15)$$

$$\frac{\partial h_c}{\partial h_i} = \frac{-(A_o/A_i)\overline{U}^2}{(h_i - (A_o/A_i)\overline{U} - R_t A_o \overline{U} h_i)^2}, \quad (16)$$

$$\frac{\partial h_c}{\partial \overline{U}} = \frac{h_i^2}{(h_i - (A_o/A_i)\overline{U} - R_t A_o \overline{U} h_i)^2}, \quad (17)$$

where $R_t$ is the thermal resistance of the tube given by:

$$R_t = \frac{\ln\left(\frac{d_{OD}}{d_{ID}}\right)}{(2\pi k_t)}. \quad (18)$$

TABLE 3

Uncertainties corresponding to experimental measurements.

| Experimental Measurement | Uncertainty |
| --- | --- |
| Cooling water temperature ($T_{out}$, $T_{in}$) | 0.15° C. + 0.12% |
| Saturated vapor pressure ($P_v$) | 1% |
| Saturated vapor temperature ($T_v$) | $T_{sat}(1.01(P_v)) - T_{sat}(P_v)$ |
| Cooling water mass flow rate ($\dot{m}$) | 1% |
| Sample surface area ($A_{OD}$) | 2% |
| Petukhov correlation heat transfer coefficient ($h_i$) | 6% |

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A heat and mass transfer component comprising:
   a lubricant-impregnated surface including:
      hydrophobic surface features comprising nanostructured surface protrusions having a hydrophobic species attached thereto; and
      a fluorinated lubricant having a viscosity in a range from about 400 mPa·s to about 6000 mPa·s impregnating the hydrophobic surface features.

2. The heat and mass transfer component of claim 1 being part or all of a heat exchanger.

3. The heat and mass transfer component of claim 1 being part or all of a distillation column.

4. The heat and mass transfer component of claim 1, wherein, when a working fluid having a surface tension in a range from about 15 mN/m to about 30 mN/m contacts the lubricant-impregnated surface, dropwise condensation of the working fluid occurs, thereby facilitating heat transfer from the component.

5. The heat and mass transfer component of claim 4, wherein the lubricant-impregnated surface is configured to sustain drop-wise condensation for a period of at least 1000 hours, the lubricant-impregnated surface thereby exhibiting long-term durability.

6. The heat and mass transfer component of claim 1, wherein, when a working fluid comprising dissolved, suspended, entrained, crystallized and/or precipitated solids contacts the lubricant-impregnated surface, deposition of solids on the lubricant-impregnated surface is inhibited, the component thereby resisting fouling.

7. The heat and mass transfer component of claim 6, wherein the lubricant-impregnated surface is configured to inhibit deposition of solids for at least 1000 hours, the lubricant-impregnated surface thereby exhibiting long-term durability.

8. The heat and mass transfer component of claim 1, wherein the thermally conductive substrate comprises a metal selected from the group consisting of Cu, Al, Fe, and Ti, and wherein the nanostructured surface protrusions comprise an oxidized metal selected from the group consisting of copper oxide, aluminum oxide, iron oxide, and titanium dioxide.

9. The heat and mass transfer component of claim 1, wherein the nanostructured surface protrusions exhibit a roughness factor r in a range from about 5 to 50.

10. The heat and mass transfer component of claim 1, wherein the hydrophobic species comprises a silane.

11. The heat and mass transfer component of claim 1, wherein the fluorinated lubricant comprises a perfluoropolyether (PFPE) oil.

12. The heat and mass transfer component of claim 1, wherein the fluorinated lubricant comprises:
 a liquid density p in a range from about 1800 kg/m$^3$ to about 2000 kg/m$^3$;
 a low surface tension γ in a range from about 10 mN/m to about 30 mN/m; and
 a vapor pressure $P_{vap}$ no greater than about $1\times10^{-7}$ kPa.

13. A method of using the heat and mass transfer component of claim 1, the method comprising:
 exposing the lubricant-impregnated surface to a working fluid having a surface tension in a range from about 15 mN/m to about 30 mN/m; and
 during the exposure, obtaining dropwise condensation of the working fluid on the lubricant-impregnated surface, wherein, due to the dropwise condensation, the heat and mass transfer component exhibits a steady state condensation heat transfer coefficient of at least about 6 kW/m$^2$K.

14. The method of claim 13, wherein the steady state condensation heat transfer coefficient is at least about 9 kW/m$^2$K.

15. The method of claim 13, wherein the exposure to the working fluid occurs for a period of at least 1000 hours.

16. The method of claim 13, wherein the working fluid further comprises dissolved, suspended, entrained, crystallized and/or precipitated solids, and
 wherein, during the exposure, deposition of solids on the lubricant-impregnated surface is inhibited, the heat and mass transfer component thereby resisting fouling.

17. The method of claim 13, wherein the working fluid comprises an alcohol and/or a hydrocarbon.

18. The method of claim 17, wherein the working fluid comprises a mixture of hydrocarbons or a purified hydrocarbon.

19. The method of claim 17, wherein the working fluid is selected from the group consisting of: ethanol, isopropyl alcohol, pentane, hexane, xylene, and toluene.

20. A method of fabricating lubricant-impregnated surface on a heat and mass transfer component, the method comprising:
 cleaning a thermally conductive substrate to form a cleaned substrate;
 exposing the cleaned substrate to a hot water or hot alkaline solution to form a thermally conductive substrate having nanostructured surface protrusions;
 depositing a hydrophobic species on the nanostructured surface protrusions to form hydrophobic surface features; and
 coating the hydrophobic surface features with a fluorinated lubricant having a viscosity in a range from 400 mPa·s to 6000 mPa·s, thereby forming a lubricant-impregnated surface on a heat and mass transfer component.

* * * * *

UNITED STATES PATENT AND TRADEMARK OFFICE
CERTIFICATE OF CORRECTION

| | | |
|---|---|---|
| PATENT NO. | : 11,525,641 B2 | Page 1 of 1 |
| APPLICATION NO. | : 16/854014 | |
| DATED | : December 13, 2022 | |
| INVENTOR(S) | : Miljkovic et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 284 days.

Signed and Sealed this
Fourteenth Day of January, 2025

Derrick Brent
*Acting Director of the United States Patent and Trademark Office*